Sept. 25, 1956 J. D. TURLAY 2,764,090

MEANS FOR DESTROYING A SWEEP WIRE

Filed Feb. 26, 1942

10 Sheets-Sheet 1

BY

INVENTOR
JOSEPH D. TURLAY

ATTORNEY

Sept. 25, 1956

J. D. TURLAY 2,764,090

MEANS FOR DESTROYING A SWEEP WIRE

Filed Feb. 26, 1942

10 Sheets-Sheet 2

INVENTOR
JOSEPH D. TURLAY

BY

ATTORNEY

Sept. 25, 1956 J. D. TURLAY 2,764,090

MEANS FOR DESTROYING A SWEEP WIRE

Filed Feb. 26, 1942

10 Sheets-Sheet 3

INVENTOR
JOSEPH D. TURLAY

BY

ATTORNEY

INVENTOR
JOSEPH D. TURLAY
BY
ATTORNEY

Sept. 25, 1956

J. D. TURLAY 2,764,090

MEANS FOR DESTROYING A SWEEP WIRE

Filed Feb. 26, 1942

10 Sheets-Sheet 5

INVENTOR
JOSEPH D. TURLAY

BY

ATTORNEY

Sept. 25, 1956

J. D. TURLAY 2,764,090

MEANS FOR DESTROYING A SWEEP WIRE

Filed Feb. 26, 1942

10 Sheets-Sheet 6

INVENTOR
JOSEPH D. TURLAY

BY

ATTORNEY

Sept. 25, 1956 J. D. TURLAY 2,764,090

MEANS FOR DESTROYING A SWEEP WIRE

Filed Feb. 26, 1942 10 Sheets-Sheet 7

INVENTOR
JOSEPH D. TURLAY

BY

ATTORNEY

Sept. 25, 1956 J. D. TURLAY 2,764,090

MEANS FOR DESTROYING A SWEEP WIRE

Filed Feb. 26, 1942 10 Sheets-Sheet 8

INVENTOR
JOSEPH D. TURLAY
BY
ATTORNEY

INVENTOR
JOSEPH D. TURLAY
BY
ATTORNEY

Sept. 25, 1956 J. D. TURLAY 2,764,090

MEANS FOR DESTROYING A SWEEP WIRE

Filed Feb. 26, 1942

10 Sheets-Sheet 10

INVENTOR
JOSEPH D. TURLAY

BY [signature]

ATTORNEY 2,764,090
Patented Sept. 25, 1956

2,764,090

MEANS FOR DESTROYING A SWEEP WIRE

Joseph D. Turlay, Bethesda, Md.

Application February 26, 1942, Serial No. 432,455
21 Claims. (Cl. 102—17)
(Granted under Title 35, U. S. Code (1952), sec. 266)

This invention relates to means for destroying a sweep wire or cable of the type generally employed for sweeping a mine field clear of mines. More specifically, the invention relates to an anti-sweep device of the submersible type adapted to be moored by a suitable length of cable in a predetermined position beneath the surface of the body of water within the path of travel of a sweep wire in which an explosive charge contained within the device is exploded in response to the engagement of the device by a sweep wire, the explosive charge being sufficiently large to effectively destroy the sweep wire.

It is the general practice at present when sweeping mine fields comprising anchored or moored types of mines to employ a wire, cable or chain, hereinafter referred to as a sweep wire towed through the water by two vessels moving substantially in the same direction and separated at some distance from each other, the sweep wire being maintained at a predetermined distance beneath the surface of the water by otter boards, depressors or similar devices. The sweep wire is usually composed of a plurality of steel wires woven together to form a cable and having projections or protuberances thereon adapted to engage the mooring cable or the antenna of a mine and sever the same as the vessels continue their onward movement. In other types of sweep wires the engagement of the sweep wire with the mooring cable or antenna of a mine, as the case may be, causes the mooring cable or antenna to be severed by the action of certain shearing devices carried by or included within the sweep wire or by reason of certain cutting edges attached thereto which slice or shear the mooring cable or antenna of the mine as the sweep wire engages the same.

The present invention contemplates the provision of new and improved means for effectively destroying the sweep wire of an enemy whereby his sweeping operations are greatly impeded and thus he is unable to sweep a mine field as effectively as heretofore. The invention is of particular advantage in the case of mine sweeping operations which are carried out simultaneously by a fleet comprising a plurality of pairs of vessels moving along in predetermined spaced arrangement with respect to each other such that a considerable area or portion of the expanse of the water is swept by a single passage of the vessels across the mine field. Thus, the destruction of a sweep wire causes a pair of vessels to be withdrawn from their respective positions within the fleet for a period of time sufficient to repair the wire or to set up a new sweep wire between the vessels, and the remainder of the fleet is therefore forced to proceed without these vessels until the repairs may be made, the fleet being reduced in size in accordance with the number of sweep wires destroyed and the rate of destruction thereof. Also the withdrawal of a pair of vessels from the fleet as a result of the destruction of the sweep wire extending therebetween necessitates the rearrangement or re-formation of the remaining vessels which, as will be readily understood, consumes an appreciable amount of time thereby further decreasing the effectiveness of the mine sweepers.

The device of the present invention comprises a casing or hermetically sealed chamber preferably having a streamlined float or a buoyant casing attached thereto in which a positive degree of buoyancy is provided sufficient to maintain the device at a predetermined distance from the bed of the body of water within which the device is planted. The device is secured to one end of a mooring cable having the other end thereof attached to a suitable anchor whereby the device is adapted to be moored to the bed of a body of water and floated at a predetermined depth of submersion beneath the surface of the water. The device is provided with a releasable firing pin adapted to explode a suitable explosive charge when an annular member movably secured to the device at the lower side thereof is actuated by a sweep wire toward the device in a direction away from the anchor.

When this occurs, the firing pin is released thereby firing a percussion cap secured to a detonating device arranged within the path of travel of the pin and causing the charge to be exploded in proximity to the sweep wire and the sweep wire to be effectively destroyed. The device is also arranged to be self-destructive in the event that it becomes loose from its moorings or is otherwise brought toward the surface of the water. In the event that the device, without being disconnected from the anchor, should be raised toward the surface of the water it will, of course, be understood that the self-destruction feature herein referred to is effective to fire the explosive charge and prevent discovery by the enemy of the construction of the device and method of operation thereof.

One of the objects of the present invention is the provision of new and improved means for destroying a sweep wire.

Another of the objects is the provision of means for firing an explosive charge adjacent the sweep wire of a mine sweeping vessel in response to the engagement of the device by the sweep wire.

Another object is to provide a new and improved firing device adapted to be armed by the pressure of the water within which the device is submerged and having means for severing a sweep wire when the sweep wire engages the device.

Still another object is the provision of new and improved means for arming a device adapted to destroy a sweep wire in which the means employed for detonating the device is brought into operative relation with an explosive charge as the device is armed.

A further object is the provision of means controlled by the pressure of the water for causing a sweep wire destroying device to be exploded in response to a predetermined decrease in the pressure of the water within which the device is submerged.

A still further object is the provision of new and improved means for destroying the sweep wire attached to a vessel which is economical to manufacture, simple in operation and possesses all of the qualities of safety, ruggedness and reliability in operation.

Still other objects, advantages and improvements will be apparent from the following specification taken in connection with the attached drawings of which:

Figure 1:
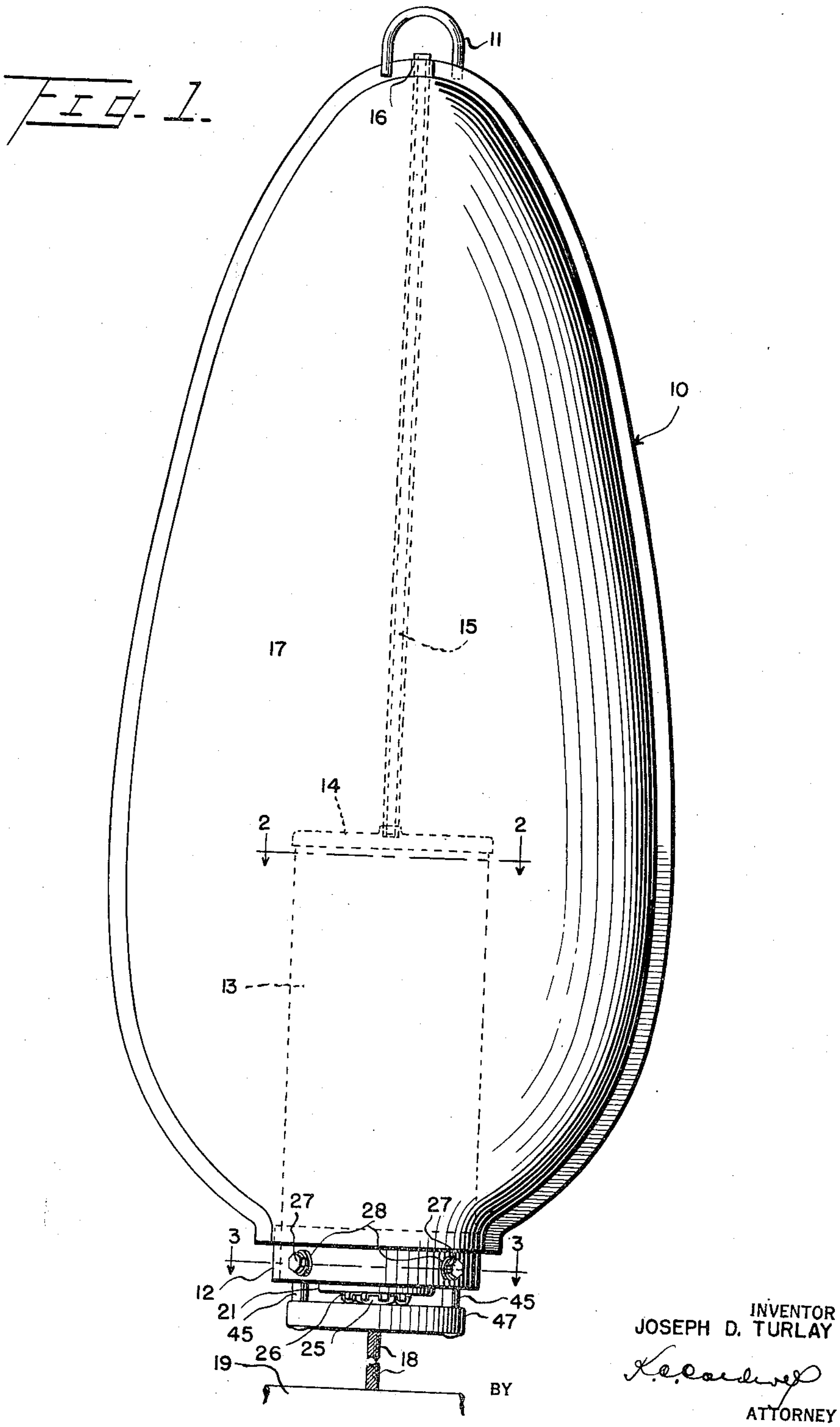
Fig. 1 is a view in elevation of the complete device.

Referring now to Fig. 1 of the drawings there is shown thereon a float member indicated generally by the numeral 10 having a U-shaped member 11 secured to the upper end thereof and an annular member 12 secured to the lower end in any suitable manner as by brazing or welding the parts together. There is secured to the annular member 12 a casing 13 having a cover 14 sealed thereto and provided with a tubular member 15 in the other end thereof secured in any suitable manner to the upper portion of the float 10 and preferably brazed or welded thereto as at 16. A structure is thus provided in which a chamber 17 is formed within the casing of the float 10 and the casing 13 including the cover 14 and tube 15 such that the float is hermetically sealed and the escape of air therefrom or the entrance of water within the chamber 17 is prevented. The float 10 is composed of any light strong material suitable for the purpose such, for example, as aluminum or steel whereby sufficient positive buoyancy is obtained when the float is submerged beneath the water to cause the float and the firing mechanism disposed therein to be urged upward against the pull of a mooring cable 18 secured at one end thereof to the anchor 19 and having the other end affixed to the support or casing 21.

The upper end of the cable 18 is flared outward as at 22 and filled preferably with molten zinc oxide to maintain the end of the cable in a flared condition, as is well known in the art to which the present invention pertains, whereby the cable may be secured to the support 21 by the sleeve 23 having a shoulder 24 thereon in registered engagement with the nut 25 threaded within the support 21, a washer 26 being provided preferably between the nut and support.

The support 21 is secured to the annular member 12 as by the bolts 27 and lock washers 28, the bolts 27 being threaded into the bosses 29 extending outwardly from the support 21 thereby to permit the passage of sea water between the support and the annular member 12 when the device is planted within the body of water. The casing 21 is provided with a laterally extending shelf or partition 31 having a centrally disposed aperture therein within which is arranged the tubular member 32 adapted to receive a detonating device indicated generally by the numeral 33. A chamber 34 is thus formed within the support 21, access thereto being obtained by the threaded aperture 35 adapted to receive a screw 36 and seal the same when the chamber has been filled with an explosive mixture 37 such as TNT or the like.

There is also provided a casing or support 38 secured in registered engagement with the support 21 as by the bolts 39 and lock washers 41, a gasket 42 of material suitable for the purpose being provided preferably between the casings 38 and 21 to prevent the leakage or passage of water therebetween.

The casing 38 is provided with a pair of bearing supports 43 in alinement with a similar pair of bearing supports 44 arranged on the casing 21, the bearing supports 43 and 44 being adapted to slideably support the pair of rods 45. The lower end of each of the rods 45 is provided with a shoulder 46 thereby to enable the rods to be securely attached to an annular member 47 disposed about the cable 18, as by riveting the rods to the annular member, although it will be understood that the rods may be secured to the annular member in any suitable manner as by threading the parts together or brazing or welding the rods to the annular member.

The upper end of each of the rods 45 is provided preferably with a shoulder 48 arranged within the complementary recessed portion of the yoke 49 and secured thereto as by the nuts 51. The yoke 49 is provided with a recessed portion 52 adapted to receive and support a tubular member 53 having a cap 54 secured thereto. The tubular member 53 is provided with a plurality of apertures 55 thereby to permit the passage of water within the tubular member 53. Disposed within the tubular member 53 is a soluble washer 56 composed of material suitable for the purpose such, for example, as a composition of salt, glycerine and glue and the like having an aperture therein within which is disposed the slideable member 57 having a nut 58 threaded on the upper end thereof and maintained in a predetermined threaded position with respect thereto as by the pin 59, a washer 60 in registered engagement with a shoulder 61 on the member 57 being arranged between the nut 54 and the soluble washer thereby to prevent movement of the slideable member 57, until the device has been submerged within the body of water for a period of time sufficient to cause the soluble washer to dissolve or soften sufficiently to permit movement of the member 57. The support 49, it will be noted is provided with an aperture 62 of sufficient size to enable the member 57 to slide freely therethrough, a plurality of apertures 63 being also provided in the support 49 to allow the entrance of water therethrough and thus to cause the soluble washer to be dissolved more quickly and positively.

There is also provided on the member 57 a shoulder 64 to which is secured as by the nut 65 and washer 66 the flexible diaphragm 67 having the outer edge thereof clamped against the shoulder 68 arranged on the support 38 as by the clamping ring 69 threaded within the support 38, the ring being provided with a plurality of slots 70 adapted to receive a suitable tool. A cup shaped member 71 is arranged preferably between the clamping ring and the flexible diaphragm, the cup shaped member having a centrally arranged aperture therein adapted to receive the member 57. The lower side of the flexible diaphragm 67 is in engagement with a cup shaped member 72 adapted to slide within a cylindrical portion 73 of the support 38 and normally urged upward by a spring 74 having the lower end thereof in registered engagement with a shoulder 75 arranged on the support 38. There is also secured to the support 38 a tubular member 76 adapted slideably to support a cylindrical member 77 disposed therein, the member 76 being secured to the support 38 as by the nut 78 and maintained at a predetermined position with respect thereto as by the pin 79 adapted to engage the slot 81 within the support 38.

The member 77 has secured thereto in any suitable manner as by threading the parts together, a bushing or support 82 within which is clamped the detonating device 33 as by the clamping ring 84 threaded within the member 82. The member 82 is also provided with an aperture 85 adapted to permit the firing pin 86 to strike a percussion cap arranged within the upper end of the detonator and fire a suitable explosive charge arranged within the detonator. The firing pin 86 is slidably supported within the member 57 and urged downward by a spring 87 having the other end thereof in engagement with a shoulder 88 within the tubular member 77. The firing pin is restrained from movement with respect to the members 57 by reason of a pair of balls 89 in registered engagement with a cut away portion 91 of the firing pin 86 and complementary apertures 92 within the member 57 when the member 77 is in the position shown in Fig. 4.

The member 57 is locked to the member 77 by a pin 93 arranged within an aperture 94 in the member 77 and a groove 95 in the member 57. The pin 93 is normally urged outward by the spring member 96 passing through the pin 93 and having one end thereof in engagement with a slot 97 within the member 77 and the other end thereof in engagement with a hole 98 within the member 77, the pin 93 being prevented from outward movement by a groove 90 within the cylindrical member 76 within which the pin is adapted to slide. The member 76 is also provided with an aperture 99 adapted to receive the pin 93 and unlock the member 77 and the plunger rod 57 when the plunger rod has been moved to the position shown on Fig. 6. There is also provided within the member 38 a slot 101 for the purpose of allowing a suitable tool to be inserted therein and force the pin 93 inward during the assembly of the device. The member 76, it will be noted, is provided preferably with a pair of downwardly projecting portions 102, Fig. 5, terminating at an annular member 103 through which the detonator 33 is adapted to be moved during the arming cycle of the device. The provision of the downwardly projecting portions 202 of the member 76 provides a pair of diametrically arranged slots thereby to facilitate the assembly of the detonator 33 within the firing mechanism.

Figures 2, 3:
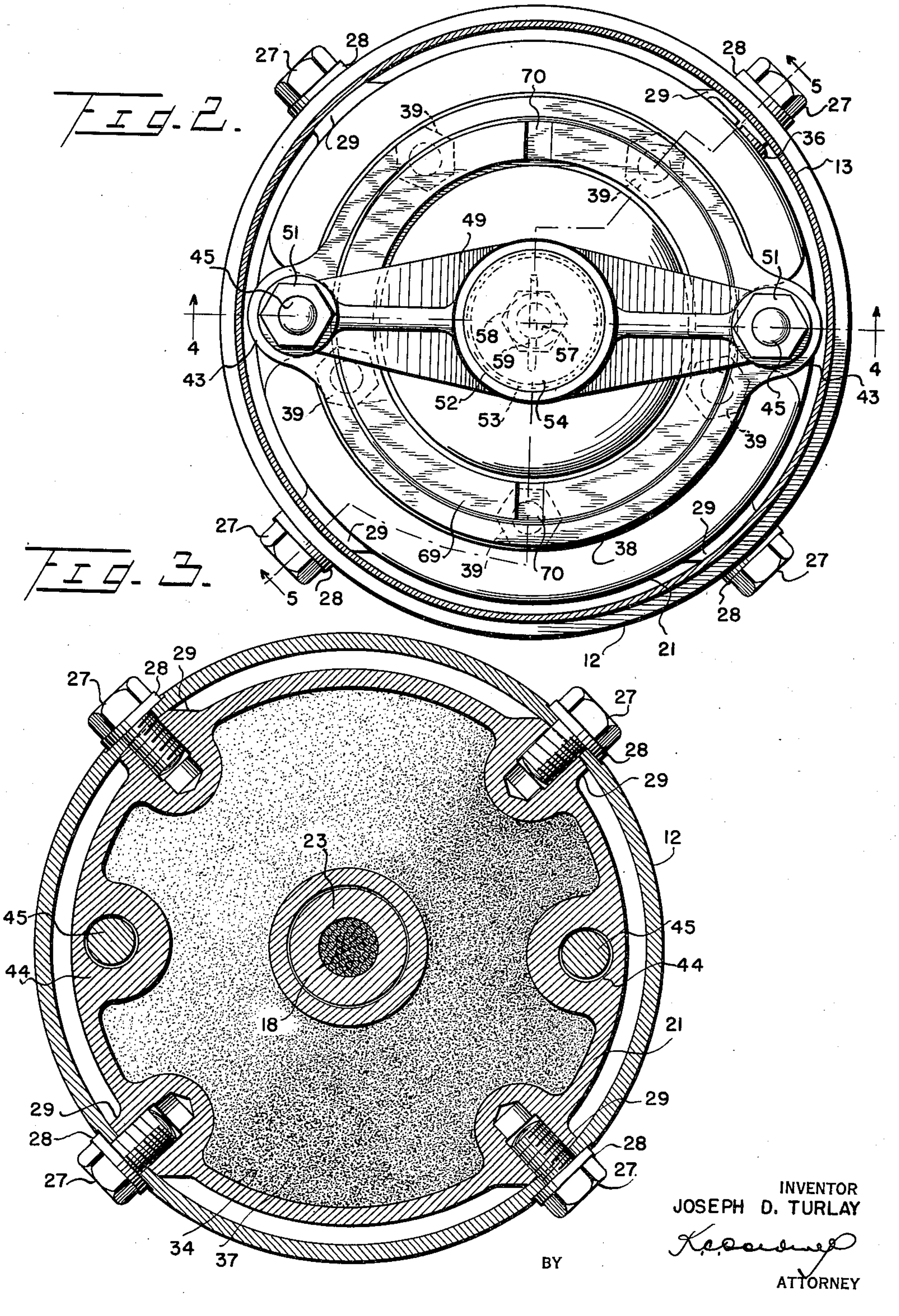
Fig. 2 is a view somewhat enlarged taken substantially along the line 2—2 of Fig. 1.
Fig. 3 is an enlarged view taken along the line 3—3 of Fig. 1.
Figure 5:
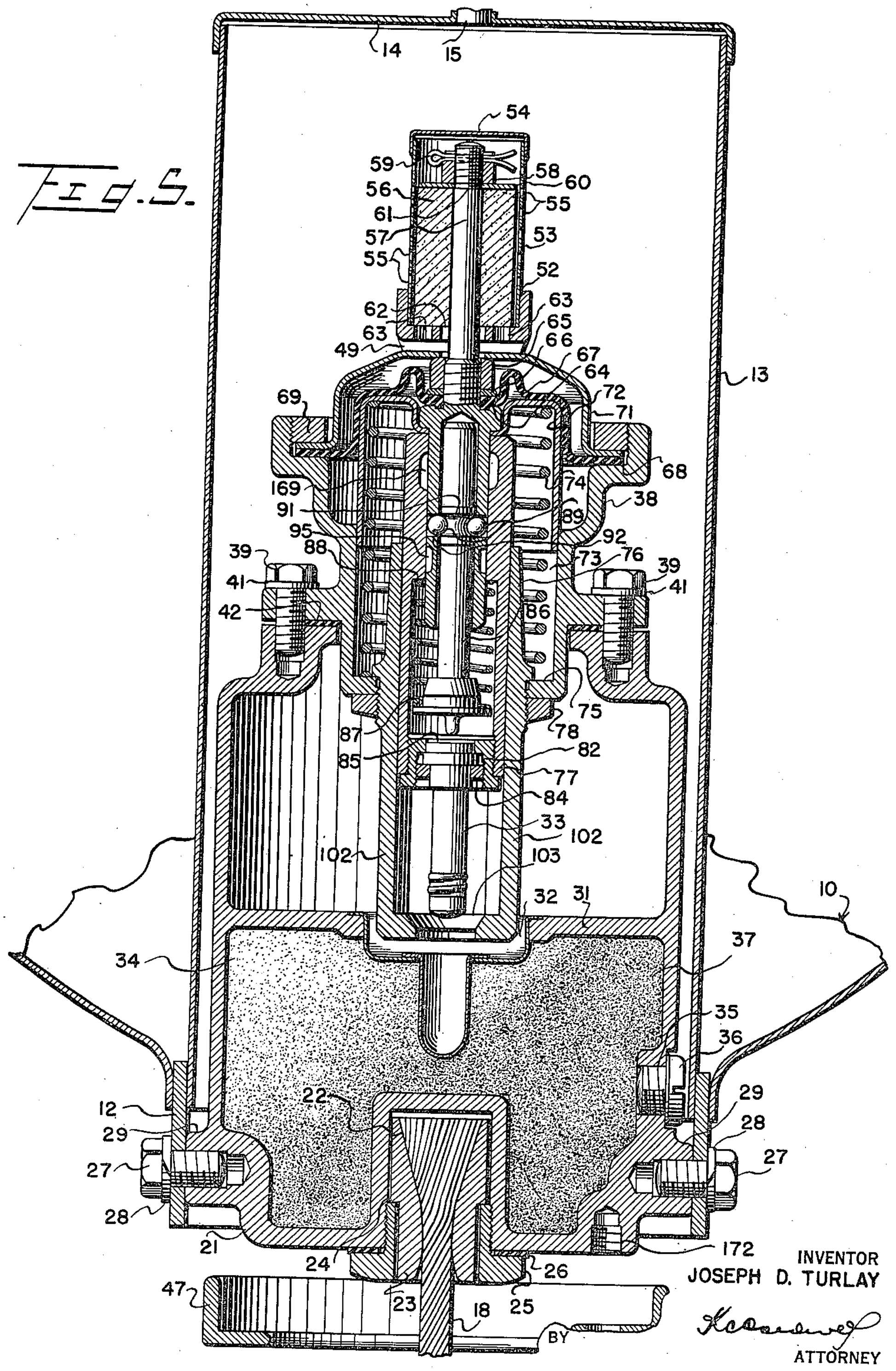
Fig. 5 is an enlarged view in section taken along the line 5—5 of Fig. 2 showing the device in an original position.
Figure 10:
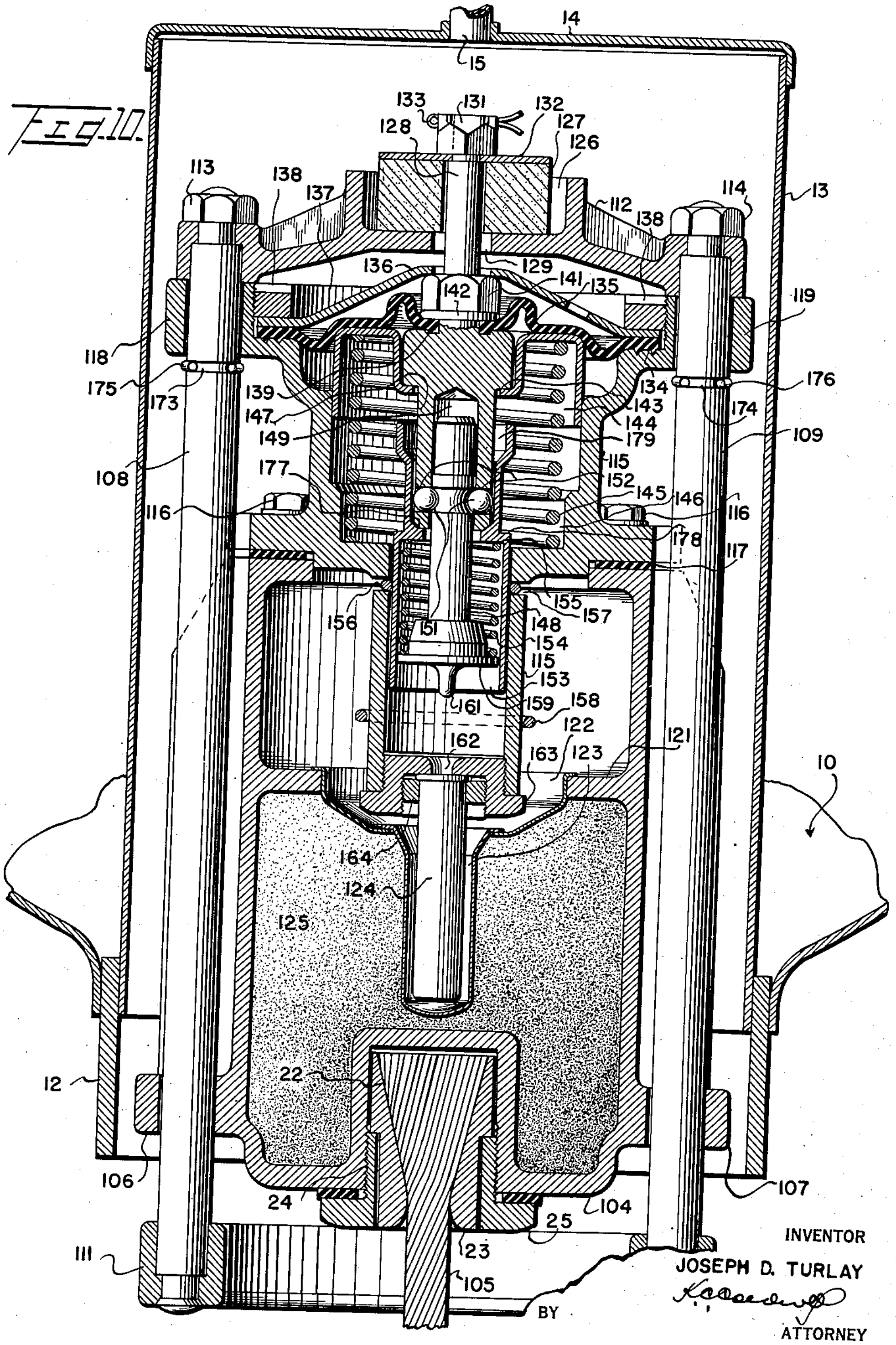
Fig. 10 is a sectional view of an alternative form of the device substantially in longitude and section.

On Fig. 10 is shown an alternative form of the invention comprising a casing 104 secured to the annular member 12 of the float 10 by suitable bolts generally in the manner of Figs. 2, 3 and 5 and provided with a mooring cable 105 secured thereto in any suitable manner such, for example, as the manner employed for securing the cable 18, Fig. 5. The casing 104 has two bosses 106 and 107 thereon adapted to slideably support the rods 108 and 109 respectively having an annular member 111 affixed to the lower end thereof. The upper end of the rods 108 and 109 is secured to a yoke 112 as by the nuts 113 and 114. The upper end of the casing 104 has secured thereto a support 115, a plurality of bolts 116 being employed for this purpose. There is also provided a suitable gasket 117 intermediate the support 115 and the casing 104 to insure a watertight connection therebetween. The support 115 is provided with a pair of bosses 118 and 119 adapted to slideably support the rods 108 and 109 respectively.

The casing 104 has a laterally extending partition 121 within which is fitted an annular member 122 comprising a cylindrical portion 123 adapted to receive the detonator 124, the partition 121 and annular member fitted thereto forming a chamber within which is arranged an explosive charge 125. The yoke 112 is provided with a well 126 within which is arranged a soluble washer 127 composed of any material suitable for the purpose such, for example, as a composition of salt, glycerine, glue and the like and having an aperture therein within which is disposed a plunger 128, the plunger 128 also passing through an aperture 129 within the yoke 112. The plunger 128 is provided with a nut 131 and a washer 132 arranged between the nut and the soluble washer to prevent movement of the plunger 128 downward until the soluble washer has been dissolved. There is also provided preferably a cotter pin 133 adapted to lock the nut 131 to the plunger 128.

The support 115 is provided with a shoulder 134 adapted to receive and support a flexible diaphragm 135 having a stop member 136 secured thereto as by the clamping ring 137 whereby the diaphragm is maintained in sealed relation with respect to the support 115. The clamping ring 137 is provided preferably with a plurality of slots 138 adapted to receive a tool suitable for clamping the same in the assembled position. The plunger 128 is provided with a shoulder 139 and a nut 141 whereby the flexible diaphragm is securely clamped to the plunger, a washer 142 being assembled preferably between the nut and the flexible diaphragm. There is also provided on the plunger 128 a shoulder 143 against which the cup shaped member 144 is urged by the spring 145, the other end of the spring being in engagement with the bottom of a recessed portion 146 within the support 115, the spring 145 being compressed somewhat thereby to urge the nut 141 upward against the back stop 136 when the device is in an unarmed position.

Figures 11, 12, 13, 14:
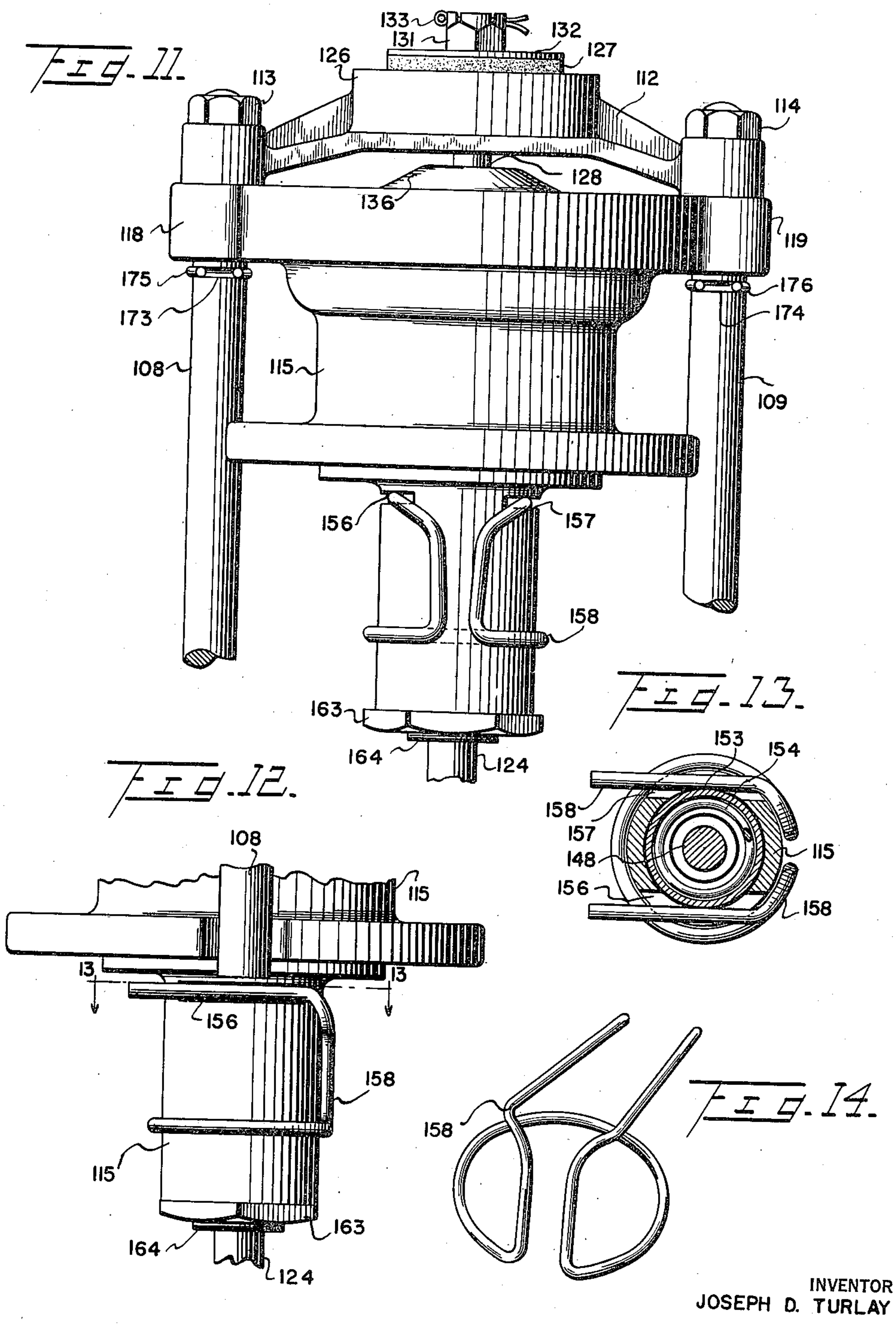
Fig. 11 is a view in elevation and partly broken away of the device of Fig. 10.
Fig. 12 is a fragmentary elevation view of the lower portion of the device of Fig. 11.
Fig. 13 is a sectional view taken along the line 13—13 of Fig. 12.
Fig. 14 is a view in perspective of the locking device of the present invention.

Disposed within the cylindrical recessed portion 147 of the plunger 128 is a firing pin 148 having a recessed portion therein adapted to be engaged by the pair of balls 151 when the recessed portion 149 in the plunger 128 is opposite apertures 152 arranged on opposite sides of the cylindrical portion 147 of the rod 128, the balls being releasably retained in a locked position by the tubular member 153. The firing pin is urged downward by a spring 154 having the other end thereof resting against a shoulder 155 arranged within the tubular member 153. The member 115 is also provided with a pair of slots 156 and 157 on opposite sides thereof within which is arranged a spring loop 158, Figs. 13 and 14.

Within the lower end of the support 115 is a cylindrical surface adapted to slideably support the tubular member 153. The firing pin, it will be noted, is provided with a bearing surface 159 adapted to slideably support the lower end of the firing pin within the tubular member 153. An arrangement is thus provided in which the firing pin and tubular member 153 are moved as a unit to an armed position with respect to the support 115, the firing pin being subsequently released by movement of the plunger rod 128 upward, thereby causing the protruding end 161 of the firing pin to pass through an aperture 162 within the cap 163 secured to the member 115 and strike the detonator 124 with force sufficient to fire the same. The detonator, it will be understood, may be secured to the cap 163 in any suitable manner as by the locking ring 164 threaded therein.

Figure 4:
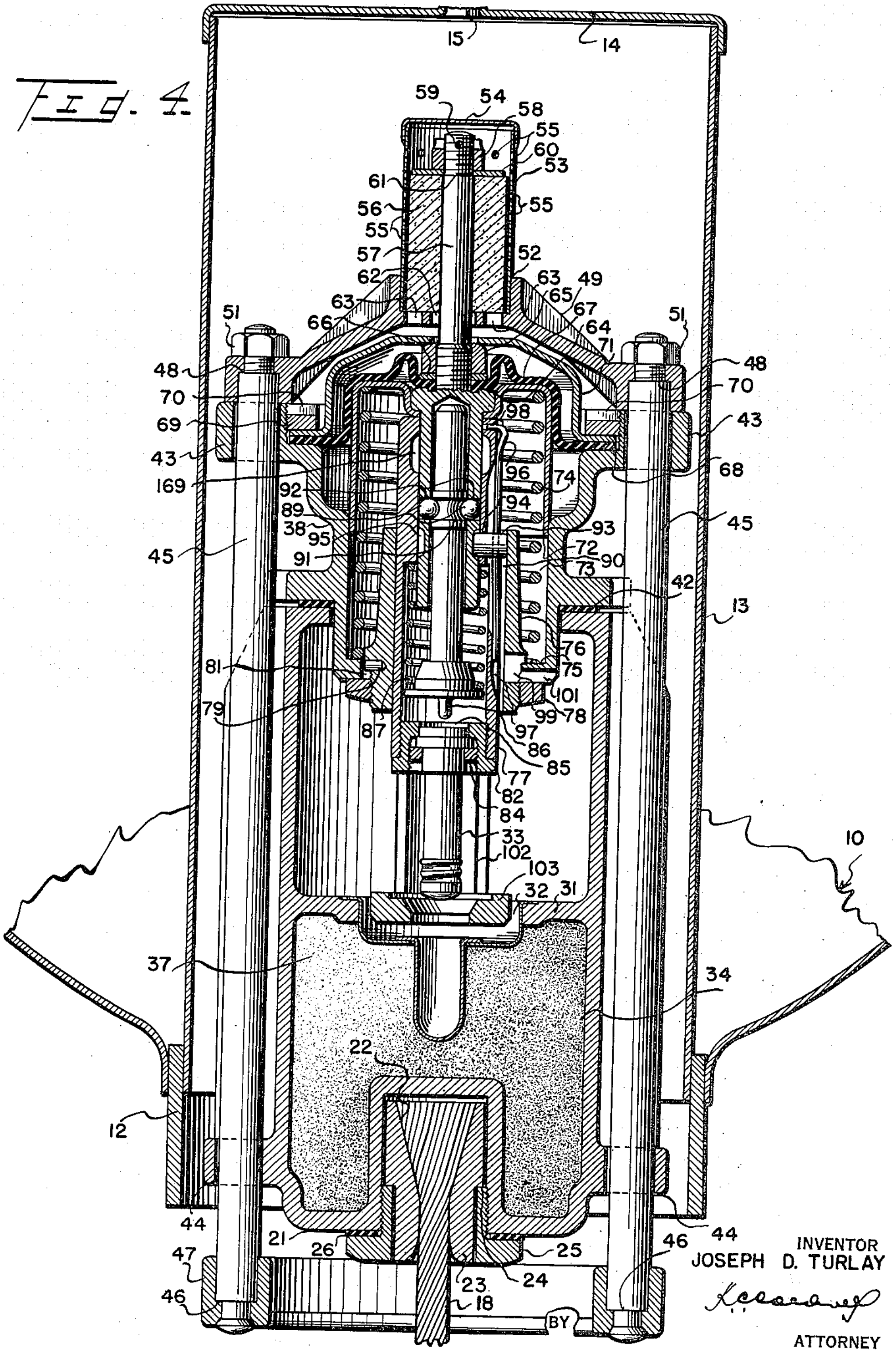
Fig. 4 is an enlarged view in section and partly broken away of the device of Fig. 1 taken substantially along the line 4—4 of Fig. 2 showing the device in an original position.

The operation of the preferred embodiment of the device will best be understood by consideration of Figs. 4 and 5 of the drawings which show the device in an unarmed condition with the detonator withdrawn from the explosive charge 37 whereby the premature detonation of the explosive charge is positively prevented. Let it be assumed, by way of example, that the device of Fig. 4 has been launched within a body of water of greater depth than the length of the mooring cable 18 and that the device is arranged within the water at a predetermined depth of submersion controlled by the depth of the water and the length of the mooring cable, the device being in a position such as shown in solid outline on Fig. 16.

Figure 6:
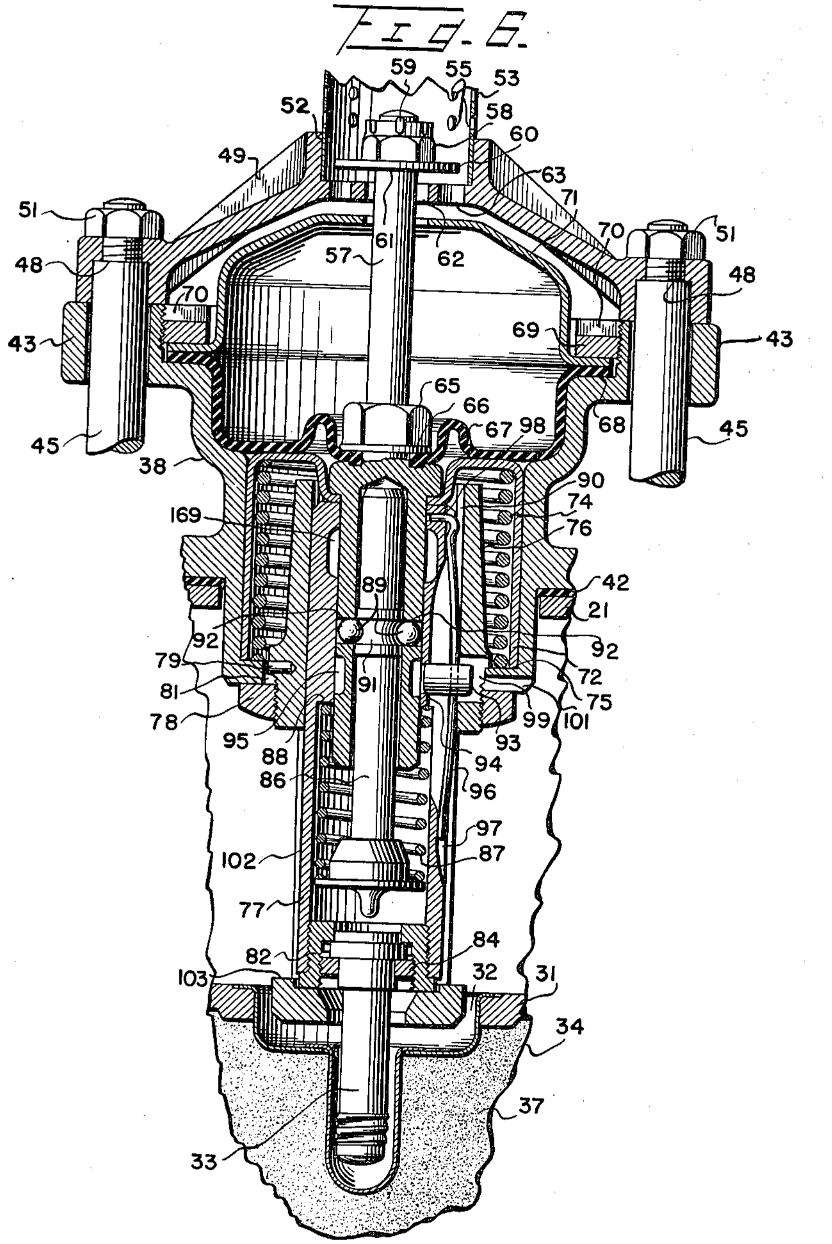
Fig. 6 is a view partly in section and partly broken away showing the device in an armed condition.

When the device has been in the water for a period of time sufficient to permit the soluble washer 56 to dissolve, the pressure of the water against the upper portion of the flexible diaphragm 67 causes the plunger 57 to be moved downward to the position shown on Fig. 6 and thereby additionally compress the spring 74 and cause the tubular member 77 to be moved downward until the pin 93 is opposite the aperture 99 within the member 76. When this occurs the pin 93 is moved outward by a spring member 96 to the position shown in Fig. 6 thereby unlocking the rod 57 from the tubular member 77. As the member 77 moves downward, the detonator 33 secured thereto moves into operative position with respect to the explosive charge 37 and the device is now in an armed condition.

Figures 15, 16:
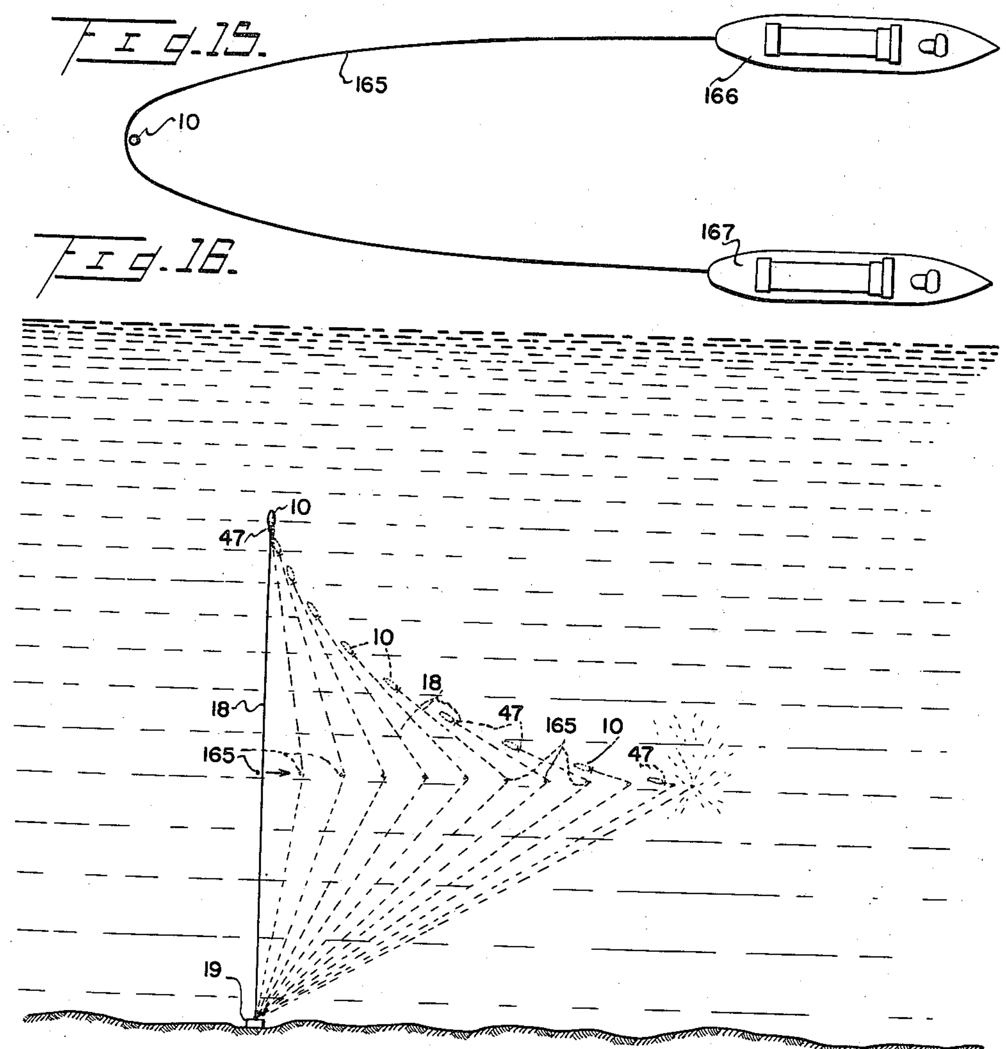
Fig. 15 is a diagrammatic view of a sweep wire.
Fig. 16 is a diagrammatic view showing the successive positions assumed by the device when the mooring cable thereof is engaged by a sweep wire.
Figure 17:
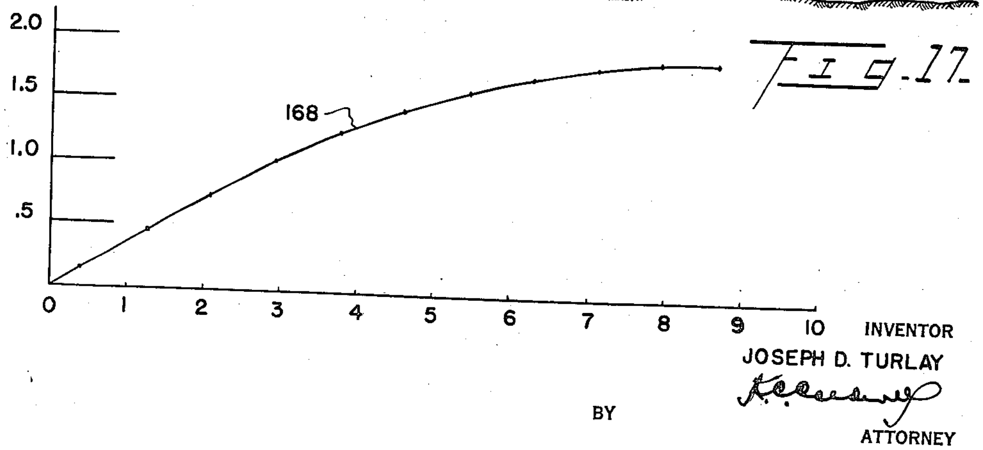
Fig. 17 illustrates in diagrammatic form the ratio of the velocity of the device with respect to the movement of the sweep wire as the sweep wire moves along the mooring cable thereof.

Let it further be assumed that the cable 18 is engaged by a sweep wire such, for example, as the sweep wire 165 being towed through the water by a pair of vessels or mine sweepers 166 and 167 of Fig. 15. When this occurs the firing mechanism within the float 10 is moved through the water at an ever increasing rate of speed as the sweep wire continues its onward movement substantially as illustrated graphically on Fig. 17 in which the numeral 168 is employed to designate the curve showing the increase in the velocity of the device through the water until the sweep wire moves into engagement with the annular member 47 thereof. If, for example, the cable 18 be assumed to be 100 feet long, the instantaneous velocity of the float through the water when the cable is engaged by the sweep wire increases in character as the mooring cable slides along the sweep wire until the sweep wire engages the firing ring 47, this rate of increase in the velocity of the float through the water is shown by way of illustration on Fig. 17 in which the sweep wire is assumed first to engage the mooring cable at a point midway between the float 10 and the anchor 19.

The velocity of the float when the sweep wire has moved ahead 15 feet beyond the original position of the mooring cable prior to engagement of the same by the sweep wire is substantially half of the velocity of the sweep wire and when the mooring cable at the point of engagement with the sweep wire has moved ahead substantially 30 feet from the original position of the mooring cable, the velocity of the float is equal to the velocity of the sweep wire. It will also be noted that when the mooring cable at the point of contact with the sweep wire has been moved ahead substantially 55 feet from the original position of the mooring cable the velocity of the float is one and one half times the velocity of the sweep wire and when the point of contact between the mooring cable and the sweep wire has moved ahead substantially 87 feet from the original position of the sweep wire the velocity of the float within the water is nearly twice that of the velocity of the sweep wire.

The shape of the float 10, as most clearly shown on Fig. 1, is streamlined thereby to offer a minimum resistance to the water as the device is hauled therethrough by the sweep wire thereby to effect a minimum strain on the cable 18 and avoid the possibility of the cable breaking before the sweep wire has engaged the firing ring 47. The manner in which the device operates to explode the charge and destroy the sweep wire as the sweep wire engages the firing ring 47 will now be described.

Figures 7, 9:
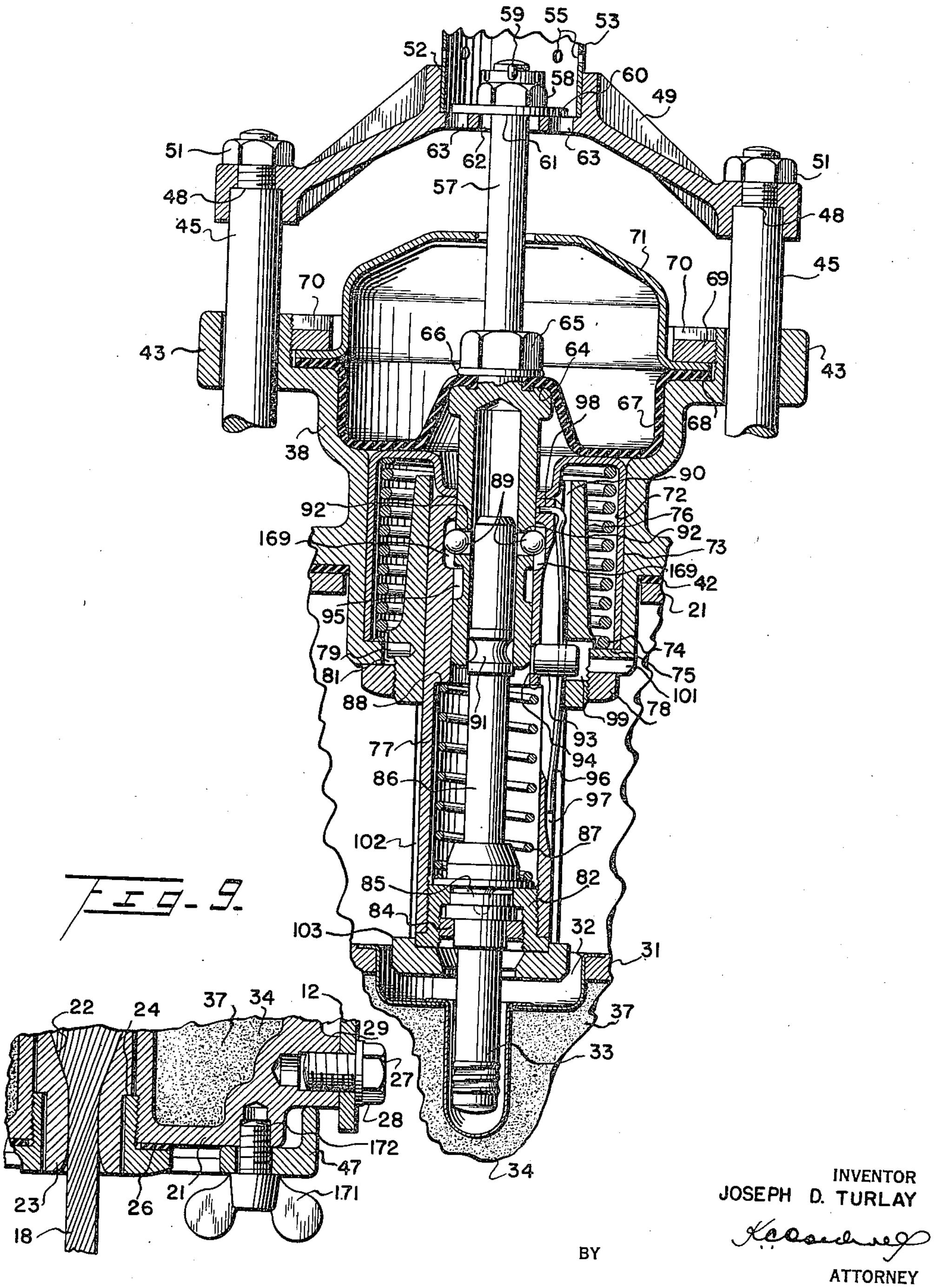
Fig. 7 is a fragmentary view partly in section showing the device fired by a sweep wire.
Fig. 9 is a fragmentary view in section showing means for locking the firing mechanism.
Figure 8:
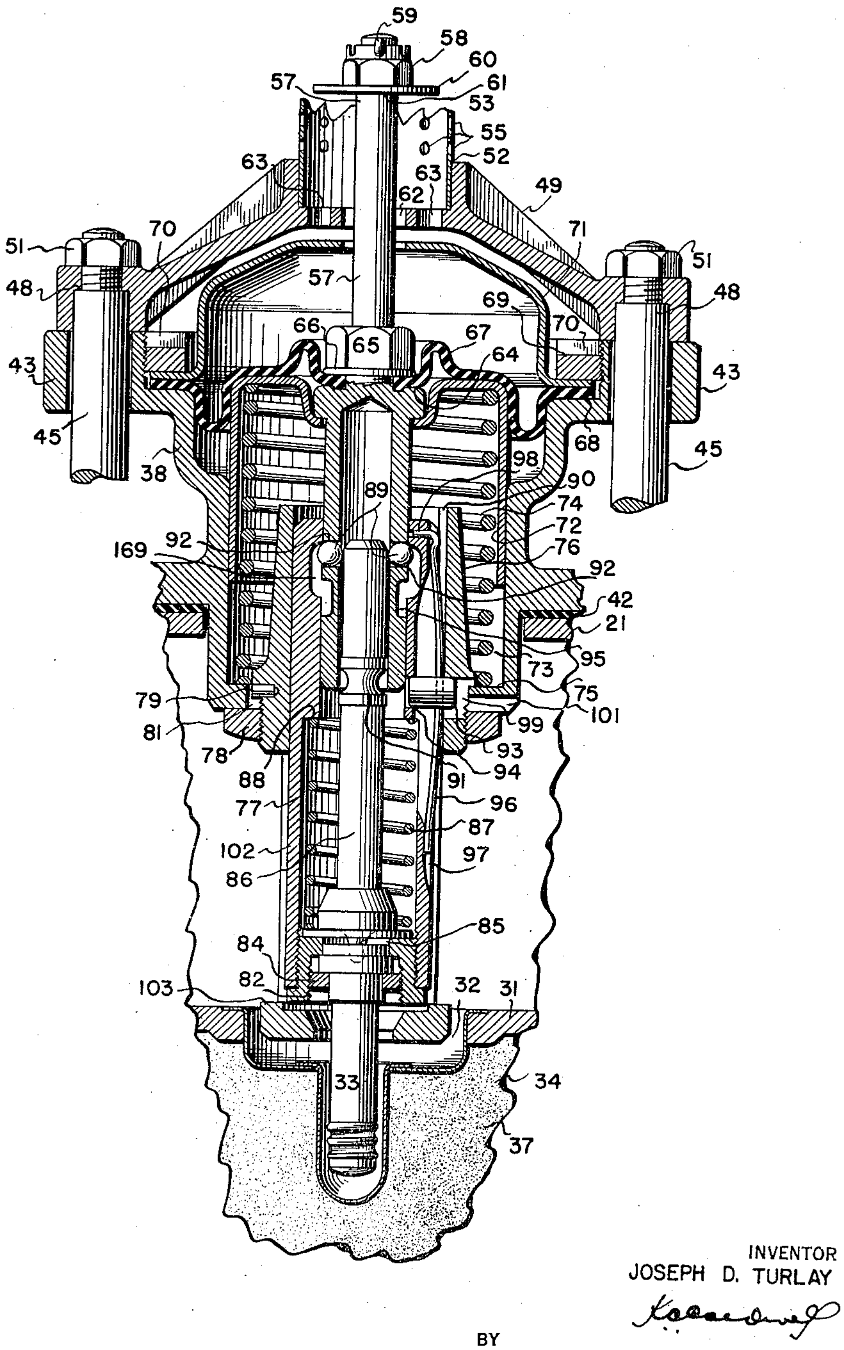
Fig. 8 is a fragmentary view partly in section showing the device fired by coming to the surface of the water.

As the sweep wire engages the annular firing member 47 the rods 45 connected thereto are moved upward thereby causing the yoke 49 secured thereto to be moved into engagement with the washer 60 and thus move the plunger 57 upward to the position shown on Fig. 7. As the plunger 57 moves upward, the firing pin 86 is also moved upward by reason of the pair of balls 89 being maintained in locked engagement with the recessed portion 91 of the firing pin by the inner cylindrical portion of the member 77 within which the plunger is adapted to slide. The member 77 is prevented from moving upward by the pressure of the water against the flexible diaphragm 67 and additionally prevented from movement by the pin 93 which, it will be noted, engages the aperture 94 within the member 77 and also is in engagement with the aperture 99 within the member 76. The member 77 is provided with an annular recessed portion 169 near the upper end thereof within which the pair of balls 89 are adapted to be moved as the firing pin is raised by the plunger 57. When the recessed portion 91 of the firing pin is moved to a position opposite the recessed portion 169 of the member 77, the pair of balls are forced outward through the apertures 92 within the member 57 thereby disengaging the firing pin from the member 57. During the movement of the firing pin upward the spring 87 is additionally compressed thereby storing sufficient energy to cause the detonator 33 to be fired as the firing pin strikes the percussion cap within the end of the detonator. As the detonator is fired, the charge 37 is exploded thereby severing and effectively destroying the sweep wire.

Whereas on Fig. 16 the sweep wire is shown at a depth of submersion such that the mooring cable 18 is engaged at the mid point thereof by the sweep wire it will, of course, be understood that this is by way of example only and that the device is adapted to be fired in proximate relation to the sweep wire regardless of the initial point of engagement of the mooring cable by the sweep wire.

In the event that the anti-sweep device is brought to the surface for any reason such, for example, as by being disconnected from the anchor 19, the reduction in the hydrostatic pressure of the water as the device approaches the surface of the water causes the explosive charge 37 to be fired thereby providing an arrangement in which the hazard to navigation of an anti-sweep device that has broken loose from its mooring is prevented and, furthermore, the arrangement disclosed prevents the enemy from bringing the device to the surface of the water for the purpose of discovering the construction and arrangement of the parts thereof. The manner in which this is accomplished will now be described.

As the anti-sweep device rises within the surface of the water the decrease of pressure in the water against the flexible diaphragm 67 thereof causes the rod 57 to be moved upward by the spring 74 until the pair of balls 89 are opposite the recessed portion 169 of the tubular member 77, the tubular member being restrained from upward movement by the pin 93 engaging the upper portion of the aperture 99 within the member 76, the other end of the pin being in engagement with the aperture 94 within the member 77. When this occurs the balls 89 are moved outward into the recessed portion 169 thereby releasing the firing pin 86 and causing the firing pin to strike the percussion cap of the detonating device 33 by reason of the energy stored in the spring 87 which is also additionally compressed as the firing pin moves upward. When the firing pin strikes the percussion cap, the detonator 33 operates and fires the explosive charge 37 thereby destroying the anti-sweep device and effectively preventing an examination of the same by unauthorized persons.

The device of Figs. 4 and 5 may, if desired, be provided with a safety device comprising a screw 171, Fig. 9, adapted to pass through a suitable aperture within the firing ring 47 and prevent movement of the firing ring downward from the support 21 by reason of the threaded engagement of the screw within the tapped hole 172 therein. The plunger rod 57 is thus effectively prevented from being moved to the armed position while the safety screw 171 is in the assembled position shown on Fig. 9 and thus the device is rendered safe in handling and during transportation of the same. It will, of course, be understood that a somewhat shorter soluble washer will be employed and, furthermore that the screw 171 is removed prior to launching the device within a body of water.

On Fig. 10 is shown a somewhat simplified form of the device in which the detonator is inserted within the explosive charge 125 during the assembly of the device and the firing pin is moved into operative relation with respect to the detonator only after the device has been planted within a body of water for a period of time sufficient to dissolve the soluble washer secured thereto. The firing mechanism is generally similar to the mechanism of Figs. 4 and 5 and for this reason will be described only in sufficient detail to enable one skilled in the art to which the present invention pertains to acquire a clear and full understanding of the operation thereof.

The rods 108 and 109 may, if desired, be provided with a circular grooved portion 173 and 174 arranged preferably just below the bosses 118 and 119 of the support 115 and adapted to receive and retain a snap ring 175 and 176 arranged on the rods 108 and 109 respectively thereby to prevent movement of the rods upward until the snap rings have been dislodged by a heavy blow such, for example, as may be received from a sweep wire. With this arrangement the safety screw 171 of Fig. 9 is not required to maintain the device in a safe condition for handling and during the transportation of the device.

When the device has been launched for a period of time sufficient to allow the soluble washer 127 to dissolve, the pressure of the water against the flexible diaphragm 135 causes the plunger rod 128 and the firing pin 161 locked thereto to be moved downward. The cylindrical member 153, it will be noted, is provided with a shoulder 177 in abutting relation with the lower end of the plunger 128 whereby the cylindrical member 153 is also moved downward by the member 128 until a shoulder 178 thereon passes beyond the slots 156 and 157, at which time the spring loop 158 moves inward in locking engagement with the shoulder 178 thereby preventing upward movement of the tubular member 153. The device is now in an armed condition.

When the firing ring 111 is engaged by a sweep wire the plunger 128 and the firing pin 161 locked thereto are moved until the pair of balls 151 are opposite the enlarged portion 179 of the cylindrical member 153. When this occurs the balls are moved outward into the enlarged portion 179 thereby releasing the firing pin. The spring 154 is additionally compressed as the firing pin 161 moves upward thereby storing sufficient energy to cause the firing pin to strike the percussion cap of the detonator 124 with sufficient force to explode the same as the firing pin is released by movement of the balls 151 into the recessed portion 179 of the cylindrical member 153. The operation of the detonator causes the charge 125 to explode and destroy the sweep wire.

In the event that the device is brought toward the surface of the water, the reduction of hydrostatic pressure on the flexible diaphragm 135 causes the plunger 128 to be moved upward by the spring 145 thereby raising the firing pin until the balls 151 are opposite the recessed portion 179 of the member 153 thereby releasing the firing pin and exploding the explosive charge 125.

Furthermore, it will be noted that the flexible diaphragm 67 employed with the device of Figs. 4 and 5 and the flexible diaphrgam 135 employed with the device of Fig. 10 comprises a double roll whereby the central portion of the diaphragm is adapted to move through a greater distance of travel than with diaphragms of the conventional type heretofore employed. A differential piston arrangement is thus provided in which the hydrostatic pressure against the area of the large piston is employed for arming the device and in which, when the device is fired by a sweep wire, it is necessary to overcome the relatively small force of the hydrostatic pressure on the small piston only. By reason of the differential piston arrangement provided the device is adapted to be employed at various depths of submersion within a body of water without impairing the efficiency or reliability of the device in operation and without reducing the effectiveness of the device in destroying a sweep wire when the mooring cable secured thereto is engaged by the sweep wire.

Briefly stated in summary, the present invention provides a firing mechanism adapted to be moored to the bed of a body of water by a suitable length of cable secured thereto in which the device is sufficiently light to impart a positive degree of buoyancy to the device and maintain the mooring cable in a substantially vertical position whereby the mooring cable is adapted to be engaged by a sweep wire in such a manner as to cause the sweep wire to be brought into contact with the device and thereby fire an explosive charge contained within the device of sufficient size to destroy the sweep wire. Furthermore, the device of the present invention is adapted to be self-destructive in the event that the device is raised within the body of water to a predetermined depth below the surface thereof.

While the invention has been described with particularity in reference to two embodiments disclosed, it is apparent to those skilled in the art that the invention in its broader aspect could be carried out by other instrumentalities.

The invention herein disclosed and claimed may be manufactured and used by and for the Government of the United States of America for governmental purposes without the payment of any royalties thereon or therefor.

What is claimed as new and desired to be secured by Letters Patent of the United States is:

1. A sweep wire destroying device of the character disclosed arranged within a body of water comprising a buoyant member adapted to cause the device to float within the water, means including a cable for mooring the device within the water, a movable annular member disposed about said cable and adapted to be engaged by said sweep wire, a plurality of rods on said device for slideably supporting said annular member, an explosive charge within the device, and means controlled by said annular member for firing said explosive charge when the annular member is engaged by said sweep wire.

2. In a moored weapon of the character disclosed comprising a buoyant casing, means including a cable for mooring said casing within the water, a chamber within said casing having an aperture in the lower portion thereof through which water is adapted to flow, an explosive charge, a firing pin adapted to explode said explosive charge, means controlled by the pressure of the water within said chamber for moving the firing pin to a predetermined armed position, means for actuating said firing pin, and means including a movable member disposed about said cable and adapted to be engaged by a sweep wire for causing the explosive charge to be fired by said firing pin.

3. In a device of the character described comprising a buoyant casing, a chamber within said casing having an aperture in the lower portion thereof through which water is adapted to flow, an explosive charge, a firing mechanism including a firing pin adapted to explode said explosive charge, means controlled by the pressure of the water within said chamber for moving the firing mechanism to a predetermined armed position, means for actuating said firing pin, means including a cable secured to said casing for mooring the device within the water, and means including a movable member disposed about said cable and adapted to be engaged by a sweep wire for causing the explosive charge to be fired by said firing pin.

4. In a device of the character disclosed arranged within a body of water at a predetermined depth of submersion, a buoyant member adapted to cause the device to float within the water, means including a cable for mooring the device within the water, means including a hydrostat for arming the device when a predetermined period of time has elapsed after the device has been planted within the water, detonating means, a firing pin releasably supported in proximate relation to said detonating means, means for actuating said firing pin, a movable member disposed about said cable and means effective when said movable member has been engaged by a sweep wire for causing the detonating means to be fired by said firing pin.

5. In a device of the character described for destroying a sweep wire, the combination of a moored float having a chamber therein in communication with the water, means for mooring the float within said water, a detonating device, an explosive charge, a firing device arranged partially without said chamber adjacent said mooring means, means controlled by the pressure of the water within the chamber for moving said detonating device into operative relation with said explosive charge, means for firing said explosive charge, and means effective when a sweep wire has engaged said mooring means and moved into contact with said firing device for causing the explosive charge to be fired by said firing means.

6. In a device for destroying a sweep wire, the combination of a casing having an explosive charge therein, a buoyant member secured to said casing adapted to impart a positive degree of buoyancy thereto, means including a cable secured to said casing for mooring said device within a body of water, a flexible diaphragm having one side thereof in communication with the water within which the device is moored, a slideable rod secured to the central portion of said diaphragm and moveable therewith, means including a resilient member for yieldably urging said diaphragm outward against the pressure of the water, said resilient member having insufficient strength to prevent movement of the diaphragm and rod inward by the pressure of the water when the device is in a moored position, a cylindrical member disposed about said rod and slideably supported thereby, means for releasably locking said cylindrical member to the rod when the rod is in an initial position, means for releasing said locking means when the rod has been moved inward to a predetermined armed position by the pressure of the water, detonating means, a firing pin slideably supported within said rod and releasably locked thereto, means for operating said firing pin, means controlled by a sweep wire for moving said rod and firing pin to a predetermined firing position, and means included within said cylindrical member for causing said firing pin to be released from said rod thereby to fire said detonating means when the rod has been moved to said predetermined firing position.

7. A mechanism for firing an explosive charge comprising a support, said support having a chamber therein adapted to receive said explosive charge, a plurality of members slideably supported by said support, an annular member secured to one end of each of said members, a yoke having an aperture therein secured to the other end of said members and adapted to be moved to a predetermined firing position as the annular member is engaged by a sweep wire, a hydrostatic device having a rod disposed within said aperture and adapted to slide within said support, means for preventing movement of said rod with respect to the yoke until a predetermined period of time has elapsed after the device has been launched within a body of water, a firing pin releasably locked to said rod and slideably supported thereby, detonating means adapted to be fired by said firing pin, means including a tubular member slideably supported within said support and disposed about said rod for supporting said detonating means, means for causing said tubular member and detonating means to be brought into operative relation with said explosive charge as the rod is actuated by said hydrostatic device, means adapted to actuate said firing pin, and means for causing the explosive charge to be fired by said firing pin when the annular member has moved to said predetermined firing position.

8. A sweep wire destroying device of the character disclosed comprising a buoyant member adapted to cause the device to float within a body of water, means including a cable for mooring the device within the water, a casing having a chamber therein adapted to receive an explosive charge, a cylindrical member slideably supported within said casing and having a detonating device secured to the lower end thereof, a tubular member slideably arranged within said cylindrical member, a firing pin slideably arranged within said tubular member and releasably locked thereto, means for releasably locking said tubular member to said cylindrical member, a hydrostat device comprising a flexible diaphragm in communication with the water adapted to move said tubular and cylindrical members to an armed position when a predetermined period of time has elapsed after the device has been planted within the water, means effective when the cylindrical member has been moved to said armed position for disconnecting the tubular member therefrom, means for locking the cylindrical member in said armed position, means for yieldably urging said firing pin in a direction toward said detonating device, means responsive to the engagement of the device by a sweep wire for moving the tubular member and firing pin to a predetermined firing position, and means for releasing the firing pin from the tubular member when the tubular member is moved to said firing position thereby to cause the firing pin to fire said detonating means.

9. In a device of the character disclosed for destroying a sweep wire, the combination of a buoyant member for causing the device to float within a body of water, means for mooring the device beneath the surface of the water, an explosive charge arranged within the device, means for detonating said explosive charge, a firing pin arranged in proximate relation to said detonating means, means including a pair of slideable devices for controlling said firing pin, means responsive to the pressure of the water for moving the firing pin and slideable devices to an armed position in which the detonating means is brought into operative relation with respect to said explosive charge, means for locking one of said slideable devices in said armed position, means responsive to the engagement of the device by a sweep wire for moving the other of said slideable devices and the firing pin from said armed position to a firing position, means for yieldably urging the firing pin toward said detonating means, and means for causing the firing pin to strike said detonating means thereby to fire the explosive charge when said other of the slideable devices has been moved to said firing position.

10. In a moored weapon adapted to destroy a sweep wire by firing an explosive charge adjacent thereto, means for detonating said explosive charge, a firing pin adapted to explode said detonating means, means including a hydrostat device for moving said firing pin to a predetermined armed position, a resilient energy storing member for yieldably urging the firing pin toward said detonating means, means responsive to the engagement of the device by a sweep wire for moving said firing pin to a firing position thereby storing additional energy in said resilient member, and means effective when the firing pin is moved to said firing position for suddenly releasing the firing pin thereby to cause the explosive charge to be fired by said detonating means.

11. In a weapon of the character disclosed for destroying a sweep wire comprising a buoyant casing, means including a cable for mooring the casing within a body of water, an annular member arranged about said cable, a firing device, means including a plurality of rods in operative connection with said firing device for slideably supporting said annular member, means responsive to the pressure of the water for arming said weapon, means controlled by the movement of said annular member as the weapon is engaged by a sweep wire for firing said firing device when the weapon is in an armed condition, and means connected to said rods for preventing movement of said annular member until a pressure impulse of predetermined strength has been applied to the annular member.

12. A weapon for destroying a sweep wire by exploding an explosive charge adjacent thereto, means including a cable for mooring said weapon within a body of water, an annular member disposed about said cable and adapted to be engaged by said sweep wire, means including a plurality of rods for slideably supporting said annular member, means operatively connected to said rods and adapted to fire said explosive charge in response to the movement of said annular member, and means including a removable safety device for preventing movement of said annular member and the premature explosion of said explosive charge during the assembly and transportation of the weapon.

13. In a weapon of the character disclosed, the combination of a firing mechanism adapted to be moored at a predetermined depth of submergence within a body of water, a piston having a firing pin releasably locked thereto, a cylindrical member within which the piston is adapted to slide, said cylindrical member having an upper surface greater in area than the area of said piston, a circular flexible diaphragm having one side thereof in communication with the water secured at the central portion thereof to said piston and adapted to move the piston and the cylindrical member to a predetermined armed position by the pressure of the water, means for yieldably urging said cylindrical member against the flexible diaphragm, means responsive to the engagement of the weapon by a sweep wire for actuating said piston to a firing position, means including a reflex portion on said diaphragm for retaining the cylindrical member in said armed position by the pressure of the water when said piston and firing pin are moved by said piston actuating means against the pressure of the diaphragm from said armed position to said firing position, and means for releasing said firing pin as the piston moves into said predetermined firing position.

14. In a sweep wire destroying mechanism having an explosive charge therein, the combination of a hydrostatic device comprising a flexible diaphragm in communication with the water within which the mechanism is disposed, said diaphragm having two concentrically arranged reflex portions, a piston secured within the inner reflex portion and adapted to be actuated thereby, a cylindrical member slideably disposed about said piston and adapted to be actuated by a portion of the diaphragm intermediate said concentrically arranged reflex portions, means controlled by the pressure of the water against the diaphragm for moving said piston and cylindrical member to an armed position, a firing pin releasably locked to said piston, means responsive to the engagement of the device by a sweep wire for moving the piston and firing pin outward to a predetermined firing position, said intermediate reflex portion of the flexible diaphragm being adapted to cause the cylindrical member to be retained in the armed position by the pressure of the water during the movement of said piston from the armed position to the firing position, and means for causing the firing pin to be released from said piston and fire the explosive charge when the piston is moved to said firing position.

15. A sweep wire destroying device of the character disclosed comprising a float of sufficient size to impart a positive buoyancy thereto when the device is arranged within a body of water, means including a cable for mooring the device within the water, a casing having a chamber therein adapted to receive an explosive charge, a cylindrical member slideably supported within said casing and having a detonating device secured to the lower end thereof, a tubular member slideably arranged within said cylindrical member, a firing pin slideably arranged within said tubular member and releasably locked thereto, means for releasably locking said tubular member to said cylindrical member, a hydrostat device comprising a flexible diaphragm in communication with the water adapted to move said tubular and cylindrical members to an armed position, means for disconnecting the tubular member from said cylindrical member when the cylindrical member has been moved to said armed position, means for locking the cylindrical member in the armed position, means for yieldably urging said firing pin toward said detonating device, means responsive to a predetermined decrease in the pressure of the water within which the device is arranged for moving the tubular member and firing pin to a predetermined firing position, and means for releasing the firing pin from the tubular member when the tubular member moves into said firing position thereby to cause the firing pin to engage said detonating means and explode said explosive charge.

16. In a weapon of the character disclosed for destroying a sweep wire, the combination of a buoyant member for causing the weapon to float within a body of water, means including a cable for mooring the weapon beneath the surface of the water, an explosive charge disposed within the weapon, a detonating device arranged within said explosive charge, a firing pin arranged at a distance from said detonating device, a slideable member adapted to support said firing pin, means for releasably locking the firing pin to said slideable member, means controlled by the pressure of the water for moving said slideable member and firing pin to an armed position in proximate relation to said detonating device, means including an annular member disposed about said cable adapted to be engaged by a sweep wire and cause the slideable member and firing pin to be moved to a firing position, and means for releasing the firing pin from said slideable member as the slideable member moves into said firing position thereby to cause the firing pin to strike the detonating device and explode the explosive charge.

17. In a weapon of the character disclosed for destroying a sweep wire, the combination of a buoyant member for causing the weapon to float within a body of water, means including a cable for mooring the weapon beneath the surface of the water, an explosive charge arranged within the weapon, a detonating device, means including a fixed tubular member for supporting the detonating device within said explosive charge, said fixed tubular member having a pair of slots diametrically arranged therein, a cylindrical member slideably disposed within said fixed tubular member, a firing pin arranged within said cylindrical member in spaced relation from said detonating device, a movable member adapted to support said firing pin, means for releasably locking the firing pin to said movable member, means for yieldably urging the firing pin toward said detonating device, means controlled by the pressure of the water for moving said cylindrical and movable members and the firing pin to an armed position in proximate relation to said detonating device, a resilient latch disposed about said fixed tubular member and extending within said slots for locking said cylindrical member in said armed position, means including an annular member disposed about said cable adapted to be engaged by the sweep wire and cause the movable member and firing pin to be moved from said armed position to a firing position, and means for releasing the firing pin from said movable member as the movable member moves into said firing position thereby to cause the firing pin to strike the detonating device and explode said explosive charge.

18. A sweep wire destroying device of the character disclosed arranged within a body of water comprising a buoyant member adapted to cause the device to float within the water, means including a flexible member for mooring the device within the water, an annular control member linearly movably supported by the device concentric with said flexible member and adapted to be engaged by said sweep wire, an explosive charge within the buoyant member, and means controlled by said control member for firing said explosive charge when the control member is engaged and moved by said sweep wire.

19. A sweep wire destroying device of the character disclosed arranged within a body of water comprising a buoyant member adapted to cause the device to float within the water, means including a flexible member for mooring the device within the water, a movable member disposed about said flexible member and adapted to be engaged by said sweep wire, rod means secured to said device for supporting said movable member, an explosive charge within the buoyant member, and means controlled by said movable member for firing said explosive charge when the movable member is engaged by said sweep wire.

20. A sweep wire destroying device arranged within a body of water and comprising an elongated buoyant member for causing the device to float within the water, means including a flexible member for mooring the device within the water, an explosive charge disposed within the buoyant member, an annular control member supported by said device and linearly movable with respect thereto and disposed adjacent said explosive charge and concentric with said flexible member, and means controlled by said movable member for firing said explosive charge when the flexible member and movable member are engaged by said sweep wire.

21. A device for destroying a sweep wire comprising a buoyant casing moored within a body of water, and annular means linearly responsive to engagement with a moving sweep wire for operating said device.

References Cited in the file of this patent

UNITED STATES PATENTS

| | | |
|---|---|---|
| 1,067,773 | Steinmetz | July 15, 1913 |
| 1,197,353 | Fungo-Ciera | Sept. 5, 1916 |
| 1,248,799 | Bozzett | Dec. 4, 1917 |
| 1,295,051 | Minkler | Feb. 18, 1919 |
| 1,304,549 | Du Pont | May 27, 1919 |
| 1,372,617 | Fullinwider | Mar. 22, 1921 |
| 1,471,628 | Palmer | Oct. 23, 1923 |

FOREIGN PATENTS

| | | |
|---|---|---|
| 124,525 | Great Britain | Apr. 3, 1919 |
| 846,738 | France | June 12, 1939 |